UNITED STATES PATENT OFFICE.

OTTO SCHMIDT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

TANNING.

1,191,480. Specification of Letters Patent. Patented July 18, 1916.

No Drawing. Application filed December 4, 1913. Serial No. 804,745.

*To all whom it may concern:*

Be it known that I, OTTO SCHMIDT, citizen of the German Empire, residing at Ludwigshafen-on-the-Rhine, Germany, have invented new and useful Improvements in Tanning, of which the following is a specification.

It is known that all natural tanning agents contain phenolic hydroxyl groups which can be readily recognized by their property of yielding intense colorations with a solution of iron chlorid. Further, the artificial tanning agents derived from aromatic organic compounds also contain, without exception, such phenolic hydroxyl groups or the corresponding quinone groups (see for instance British Patents Nos. 4605/07 and 8511/12).

I have found that the presence of phenolic hydroxyl or quinone groups is not an absolute necessity in order that the compound in question should possess tanning properties, for I have discovered that aromatic sulfonic acids of an amorphous character, which are free from phenolic hydroxyl and quinone groups, are soluble in water, are free from dyeing properties and are capable of precipitating glue or gelatin from solutions thereof, possess good tanning properties.

As particular instances of compounds which fulfil the above conditions I mention the sulfonic acids of high molecular products which contain several benzene or naphthalene residues or the like and especially those in which the said residues are connected to one another by intermediate carbon atoms. Compounds which are particularly suitable are obtainable as described, for instance, in the specification of my application for Patent Serial No. 804,744, filed December 4, 1913, by reacting with formaldehyde or a body capable of giving rise to formaldehyde on a naphthalene sulfonic acid, either in the presence or absence of condensation agents, or by sulfonating the resins obtainable from formaldehyde and naphthalene, such as are described in the specification of British Patent No. 16,245/07.

Skins can be tanned in an excellent manner with products of the above kind and give rise very rapidly to a strong leather which is almost colorless and of great softness and pliability. The tanning process can be carried out either with the above mentioned products alone or in conjunction with other tanning agents.

The following examples will serve to illustrate further the nature of this invention, which, however, is not confined to these examples. The parts are by weight.

Example 1: Heat together 10 parts of naphthalene and 10 parts of sulfuric acid, for 8 hours, at from 150° to 155° C., cool to about 80° to 90° C., then add, in small portions at a time, while stirring vigorously, 4 parts of formaldehyde at from 60° to 100° C. When condensation is complete, partially neutralize the product with 35% caustic soda solution until the point is reached where 10 grams of the product still require 10 cubic centimeters of normal caustic soda solution to complete neutralization. Dissolve 200 parts of the viscous mass obtained in 4,000 parts of water and introduce the well bated skin into this solution and tan it for about 3 days. The tanning is completed when the skin, after being cut and then touched on the cut surface with a solution of indigo-sulfonic acid and then washed, no longer shows a blue inner zone. The addition of common salt to the tanning bath is often advantageous. In a similar manner, other tanning agents of the kind hereinbefore described may be employed.

Example 2: Heat together, for six hours, at 150° C., ten parts of naphthalene and ten parts of ninety-seven per cent. sulfuric acid, then allow to cool, while adding two parts of water, until a temperature of about 100° C. is attained and then, while maintaining this temperature, add four and three-tenths parts of thirty per cent. formaldehyde solution and continue stirring until the odor of formaldehyde has disappeared. Then add so much caustic soda solution of thirty-five per cent. that ten grams of the reaction product require ten cubic centimeters of n rmal caustic soda solution for complete n{ .tralization. Dissolve two hundred parts of the mass thus obtained in four thousand parts of water and add one hundred and fifty parts of common salt. Introduce the limed and bated skins into this solution and stir until a section of the leather, on being touched with indigo-sulfonic acid solution, gives a uniform color over the whole section. The period of tanning lasts for about four days. Then finish off the leather in the usual manner. In this way an almost colorless, soft and strong leather with long fibers is produced which is similar to leather which has been prepared with the aid of natural tanning agents.

Example 3: Sulfonate one hundred parts of carbazole with two hundred parts of concentrated sulfuric acid at 130° C. When the sulfonation is complete, add fifty parts of water and allow thirty parts of a thirty per cent. formaldehyde solution to flow into the mixture. When the odor of formaldehyde has disappeared, pour the mass into water and add sufficient slaked lime to fix the excess of sulfuric acid. Filter off the solution from the calcium sulfate and, after diluting the filtrate until it possesses a specific gravity of 2° Bé., employ it directly for tanning, which may be carried out in any suitable manner. Instead of employing the solution as described in this example, it may be previously nearly neutralized.

Example 4: Sulfonate thirty parts of retene with seventy parts of sulfuric acid at 110° C. Cool to about 40° C., add twenty parts of water and then add, drop by drop, ten parts of a thirty per cent. formaldehyde solution. Continue stirring until the odor of formaldehyde has disappeared and then work up the product in the manner described in the foregoing Example 3. The product can be employed for tanning in the manner described in the foregoing Example 2.

Example 5: Melt two hundred and twenty-six parts of beta-naphthalene-sulfonic acid, while stirring, and add thirty-seven and a half parts of sulfur chlorid in small portions at a time. When the evolution of hydrochloric acid has ceased, dilute with water, boil up, filter from any sulfur which may be present, add caustic soda solution, if necessary, in order to make the filtrate nearly neutral, and then dilute until a five per cent. solution is obtained. The solution thus produced can be employed directly for tanning, any suitable process of tanning being employed.

Now what I claim is:—

1. The process of tanning skins by treating them with a solution of an aromatic sulfonic acid of an amorphous character, which is free from phenolic hydroxyl and quinone groups, is soluble in water, is free from dyeing properties and is capable of precipitating glue or gelatin from solutions thereof.

2. The process of tanning skins by treating them with a solution of a product from napthalene, sulfuric acid and formaldehyde, which product is of an amorphous character, free from phenolic hydroxyl and quinone groups, is soluble in water, is free from dyeing properties and is capable of precipitating glue or gelatin from solutions thereof.

In testimony whereof I have hereunto set my hand in the presence of two subscribing witnesses.

OTTO SCHMIDT.

Witnesses:
J. ALEC LLOYD,
S. S. BERGER.